Feb. 3, 1970
T. WEIR ET AL
3,493,339
PRODUCTION OF CARBON DIOXIDE AND ARGON
Filed June 7, 1967
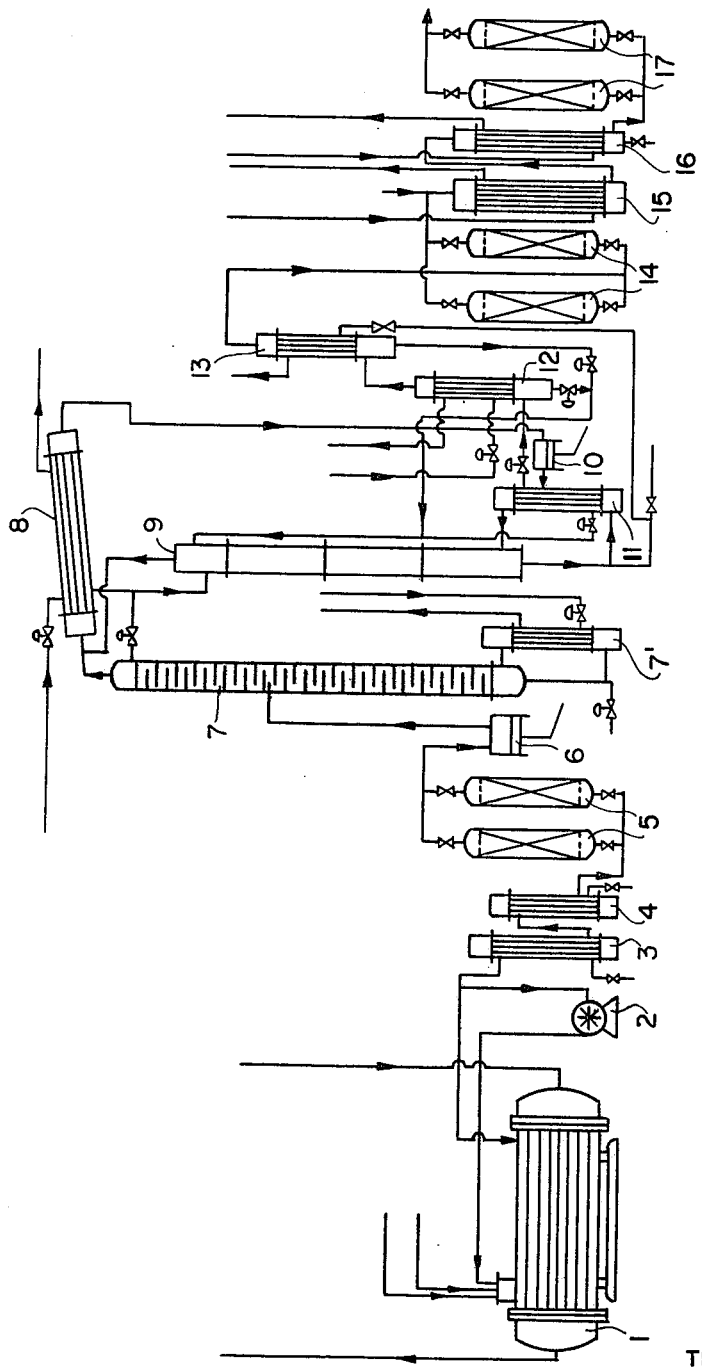
INVENTORS
THOMAS WEIR
ALFRED GORDON WHELDON
BY
*Jacob & Jacobs*
ATTORNEYS United States Patent Office 3,493,339
Patented Feb. 3, 1970

3,493,339
PRODUCTION OF CARBON DIOXIDE AND ARGON
Thomas Weir, London, and Alfred Gordon Wheldon, Galleywood, Essex, England, assignors, by mesne assignments, to The Distillers Company (Carbon Dioxide), Limited, Reigate, Surrey, England, a British company
Filed June 7, 1967, Ser. No. 644,377
Claims priority, application Great Britain, June 23, 1966, 28,050/66
Int. Cl. C01b 23/00, 31/20; B01d 53/00
U.S. Cl. 23—150                    5 Claims

ABSTRACT OF THE DISCLOSURE

Carbon dioxide and argon are obtained by burning a carbon-containing substance such as a heavy fuel oil in a mixture of argon and oxygen conveniently obtained from an air liquefaction plant. Water is removed from the combustion products by condensation and drying. They are then liquefied and fractionally distilled. If the carbon-containing substance also contains sulphur, sulphur dioxide is formed on burning and this also is separated as a base product by distillation.

---

The present invention relates to a process for the production of carbon dioxide and argon.

Hitherto one method for the commercial production of carbon dioxide has been by combusting carbonaceous fuels in air. This results in a gaseous mixture consisting mainly of carbon dioxide and nitrogen. The carbon dioxide is usually adsorbed in a suitable adsorption medium, the nitrogen and inert gases such as argon are allowed to escape, and carbon dioxide is regenerated from the adsorption medium by the application of heat. Most carbonaceous fuels contain some sulphur and thus sulphur dioxide is also produced as a by-product in the combustion process. The removal of sulphur dioxide gas from the combustion gases is an expensive process involving scrubbing and the use of alkali. Moreover the sulphur dioxide is not in a commercially useful form and thus has to be disposed of, which again presents effluent problems leading to further expense.

The present invention provides a process for the production of carbon dioxide and argon which comprises subjecting a mixture of argon and oxygen to combustion with a combustible carbon-containing compound or compounds, and separating the combustion products to obtain a carbon dioxide fraction and an argon fraction.

The mixture of argon and oxygen is conveniently obtained from the liquefaction and fractional distillation of air. The separation into a nitrogen-containing fraction and an argon- and oxygen-containing fraction is readily effected as argon and oxygen are very close in volatility, whereas there is a relatively large difference between the volatility of nitrogen and the volatility of argon and oxygen.

The combustion is carried out using coke, coal, fuel oil, methane or similar compounds as the carbon-containing compound. The combustion preferably takes place in boilers under approximately stoichiometric conditions, and moderation of the combustion can be achieved by recycle of some of the reaction products. The boilers may be water-tube boilers.

The combustion products can be separated by cooling and drying the products, subjecting them to a liquefaction step and finally separating them by a distillation process.

For economic reasons it is preferred to use a heavy fuel oil as the carbon-containing compound. Such an oil contains about 3% of sulphur which gives rise to a corresponding proportion of sulphur dioxide gas in the products of combustion. Although not restricted to the use of carbon-containing compounds having a sulphur impurity the process of the present invention will hereafter be described with reference to such compounds since these are the compounds most likely to be used in practice.

According to a feature of the present invention where a sulphur impure carbon-containing compound is used, sulphur dioxide is removed from the cooled, dried, liquified combustion products as a high boiling base product from a distillation process. In this way sulphur dioxide is successfully removed from the combustion products and moreover since it is in liquid form it is a commercially useful by-product of the process rather than being a commercial embarrassment.

The combustion products when fuel oil is used, comprise essentially carbon dioxide, water vapour, argon and sulphur dioxide. The hot gases are then cooled and dried. For example, the gases can be passed into a heat exchanger, such as a water-cooled shell and tube heat exchanger, where most of the water vapour may be removed. Further removal of water vapour can be effected by passing the gases into a heat exchanger and cooling to about 2° C. The gases can be dried for example in a tower packed with silica gel, or by contact with any other suitable dessicant. The silica gel may be periodically reactivated, e.g. by passing through the tower dry nitrogen heated to a temperature above 100° C. The nitrogen may conveniently be obtained from an air separation plant.

The dried gases consist of carbon dioxide, sulphur dioxide, argon and any oxygen in excess of the combustion requirements together with trace quantities of nitrogen. To separate the gases into a carbon dioxide fraction, an argon fraction and a sulphur dioxide fraction the gases are compressed, preferably in an oil-free reciprocating compressor before being fed to a distillation system.

The distillation system may consist, for example, of two distillation columns. The sulphur dioxide present is then removed from the gases as a high-boiling base product from the first column. Substantially pure carbon dioxide is removed as base product from the second column. The overhead product from the second column consists of argon, carbon dioxide and any oxygen in excess of the combustion requirements and trace quantities of nitrogen. Alternatively, the order of the columns may be reversed, i.e. low-boiling impurities may be removed in a first column and high boiling (sulphur dioxide) in a second.

The carbon dioxide can be removed from the overhead mixture of argon, carbon dioxide and oxygen by adsorption on molecular sieve material. The molecular sieve is then regenerated by means of a combined pressure swing and temperature cycle.

Following the removal of carbon dioxide, the argon and oxygen mixture (containing trace amounts of nitrogen) is mixed with a stoichiometric quantity of hydrogen in the presence of a catalyst for the reaction of hydrogen and oxygen, for example palladium. As is well-known in such catalytic reactions explosive conditions can be realised and these conditions can be avoided by for example recycling argon or by adding the hydrogen gradually in a series of stages. The hydrogen and oxygen then combine to form water. The reaction may be carried out, for example, in a shell and tube heat exchanger having the palladium catalyst packed in the tubes. The heat of reaction may be removed by boiling water in the shell of the heat exchanger.

The water vapour formed from the reaction is largely removed by cooling, and the final traces of moisture may be removed by, for example, silica gel driers. The substantially pure argon may then be compressed for filling into cylinders.

If desired, removal of the trace quantities of nitrogen from the argon may be brought about in a final purification stage employing, for example, either reaction with metallic calcium or liquefaction and fractional distillation.

The boilers in which the carbon-containing compounds are burnt may be used to raise steam which may be used directly in prime movers and/or fed to a turbine to generate electricity. The electricity generated may be used to supply the electrical requirements of the process and any excess may be fed into the grid.

The sulphur dioxide which is removed from the reaction product may be converted to sulphuric acid, for example.

The accompanying drawing is a diagrammatic illustration of apparatus in which the process of the present invention may be carried out.

A heavy fuel oil consisting of approximately 85% w./w. carbon, 11% w./w. hydrogen and 4% w./w. sulphur is combusted in a boiler 1, at approximately 5 p.s.i.g. with an oxygen/argon fraction obtained from an air separation plant. Combustion conditions are adjusted very closely to stoichiometric proportions. A quantity of the combustion gases is recycled by means of a pump 2 to moderate the reaction.

The gases leaving the boiler are first passed through a water-cooled heat exchanger 3 in which the bulk of the water vapour formed from the combustion is condensed. The gas is then further cooled to 2° C. with further condensation of water vapour by indirect heat exchange with evaporating ammonia in cooler 4. The cooled gas is then passed to one of two interchangeable silica gel driers 5 where the moisture content is reduced to a low level preferably below 50 p.p.m. by volume.

The dry gaseous mixture, consisting principally of carbon dioxide, argon and sulphur dioxide together with small amounts of oxygen and nitrogen is then passed to a compressor 6 and compressed to 300 p.s.i.g., and fed into a tailing column 7. Reflux for the tailing column 7 is fed from condenser 8 and boil-up provided by a steam heated reboiler 7' at the base of column 7. Sulphur dioxide is separated as a bottom product in the tailing column 7 and the overhead gas, substantially free from sulphur dioxide, is fed to the condenser 8 where it partially liquefies.

Liquid from the condenser 8 is partly returned as reflux to the tailing column 7 and partly fed to a topping column 9 where the light-boiling components (argon, oxygen, nitrogen) are separated from the carbon dioxide. The boil-up for the topping column 9 is supplied by compressing to 1000 p.s.i.g. a gaseous fraction drawn from the upper reaches of the condenser 8 by means of a compressor 10 and subjecting it to a partial liquefaction step in a reboiler 11. This fraction is relatively rich in the light-boiling impurities. Pure carbon dioxide is withdrawn from the base of the topping column 9.

The argon-rich gas from the reboiler 11 is cooled by any suitable refrigerant, e.g. by evaporating liquid ammonia at −40° F. in a shell and tube heat exchanger 12 and by evaporating liquid carbon dioxide at −65° F. in a similar heat exchanger 13. The condensate (principally carbon dioxide) produced in these partial liquefaction stages is returned to the topping column 9.

The cold gas from the partial liquefaction stages is passed through one of two interchangeable towers 14 containing a synthetic zeolite material suitable for the adsorption of carbon dioxide. The gas issuing from these towers is substantially free from carbon dioxide, consisting essentially of argon contaminated with relatively small amounts of oxygen and nitrogen. This gas is dosed with the stoichiometric quantity of hydrogen required to combust the oxygen it contains and contacted with a palladium catalyst packed in the tubes of a shell and tube exchanger 15. The heat of reaction is removed by boiling water in the shell of the exchanger.

The hot gas from the reactor 15 is cooled in a water-cooled exchanger 16 when the bulk of the water-vapour resulting from the reaction of the hydrogen and oxygen is condensed.

The gas is then finally dried by passing it through one of two interchangeable towers 17 packed with silica gel resulting in substantially pure argon.

As an alternative method of removing the contaminating oxygen from the cold gas of the partial liquefaction stages a catalytic combustion may be effected with a light hydrocarbon gas, for example methane. The contaminating oxygen is converted, in this instance, into water and carbon dioxide. The water may be removed by cooling and adsorption on a suitable desiccant and the carbon dioxide removed, for example, by adsorption on a synthetic zeolite.

In certain welding operations mixtures of argon and carbon dioxide are required and such mixtures can be readily obtained from the process of the present invention.

We claim:

1. A process for the production of carbon dioxide and the separation of argon which comprises subjecting a mixture of argon and oxygen to combustion with a combustible carbon-containing compound or compounds in stoichiometric proportions necessary for the production of carbon dioxide and separating the combustion products to obtain a carbon dioxide fraction and an argon fraction.

2. A process as claimed in claim 1 wherein the mixture of argon and oxygen is obtained from the liquefaction and fractional distillation of air.

3. A process as claimed in claim 1 wherein the combustible carbon-containing compound in a heavy fuel oil.

4. A process as claimed in claim 1 wherein the combustion products are separated by cooling and drying the products, subjecting them to a liquefaction step and separating them by a distillation process.

5. A process as claimed in claim 4 wherein, when a sulphur impure carbon-containing compound or compounds is used, sulphur dioxide is removed from the distillation process as a high boiling base product.

References Cited

UNITED STATES PATENTS

| 2,284,662 | 6/1942 | Kahle | 23—209 |
| 3,169,845 | 2/1965 | Kornemann et al. | 23—209 |

OSCAR R. VERTIZ, Primary Examiner

S. B. SHEAR, Assistant Examiner

U.S. Cl. X.R.

23—2, 179, 209